United States Patent
Wang

(10) Patent No.: US 7,791,702 B2
(45) Date of Patent: Sep. 7, 2010

(54) DISPLAY PANEL COMPRISING SECTIONS OF AT LEAST ONE OF THE CONNECTING WIRES HAVING DIFFERENT THICKNESSES AND METHOD OF MANUFACTURING THE SAME

(75) Inventor: Ching-Yi Wang, Tao-Yuan Hsien (TW)

(73) Assignee: AU Optronics Corp., Science-Based industrial Park, Hsin-Chu (TW)

(*) Notice: Subject to any disclaimer, the term of this patent is extended or adjusted under 35 U.S.C. 154(b) by 406 days.

(21) Appl. No.: 11/420,476

(22) Filed: May 26, 2006

(65) Prior Publication Data

US 2007/0206146 A1    Sep. 6, 2007

(30) Foreign Application Priority Data

Mar. 2, 2006   (TW) ............................... 95107084 A

(51) Int. Cl.
G02F 1/1345 (2006.01)
(52) U.S. Cl. .................. 349/151; 349/149; 349/152
(58) Field of Classification Search .......... 349/149–152
See application file for complete search history.

(56) References Cited

U.S. PATENT DOCUMENTS

| | | | | |
|---|---|---|---|---|
| 5,652,632 | A * | 7/1997 | Shimizu | 349/40 |
| 6,683,669 | B1 * | 1/2004 | Fujikawa | 349/149 |
| 6,717,629 | B2 * | 4/2004 | Sumi et al. | 349/40 |
| 6,970,225 | B2 * | 11/2005 | Tanaka et al. | 349/147 |
| 7,012,664 | B2 | 3/2006 | Moon et al. | |
| 2002/0075439 | A1 * | 6/2002 | Uehara | 349/149 |
| 2003/0086048 | A1 * | 5/2003 | Ukita | 349/149 |
| 2003/0227592 | A1 * | 12/2003 | Izumi et al. | 349/149 |
| 2004/0023128 | A1 * | 2/2004 | Yamamoto et al. | 430/5 |
| 2005/0057467 | A1 | 3/2005 | Fujita | |
| 2005/0237812 | A1 | 10/2005 | Chang | |

FOREIGN PATENT DOCUMENTS

| | | |
|---|---|---|
| CN | 1360296 A | 7/2002 |
| CN | 1416001 A | 5/2003 |
| JP | 2001-118847 | 4/2001 |
| JP | 2003-140181 | 5/2003 |
| JP | 2004-62095 | 2/2004 |
| JP | 2004-213020 | 7/2004 |
| KR | 2003-0094599 | 12/2003 |
| KR | 10-2004-0013534 A | 2/2004 |
| KR | 10-2004-0050523 | 6/2004 |
| KR | 10-2005-0019025 | 2/2005 |

* cited by examiner

*Primary Examiner*—Andrew Schechter
*Assistant Examiner*—Charles Chang
(74) *Attorney, Agent, or Firm*—Winston Hsu

(57) ABSTRACT

A display panel includes a substrate, a plurality of data lines, a driver integrated circuit, and a plurality of connecting lines. The data lines of the display panel are disposed on a display area of the substrate for signal transmission. The driver integrated circuit is electrically connected to the data lines for providing driving signals required for panel operations. Each data line of the display panel is electrically connected to the driver integrated circuit via a corresponding connecting line. A first connecting line of the connecting lines includes a first section and a second section, wherein a thickness of the second section is substantially thinner than that of the first section.

15 Claims, 7 Drawing Sheets

DISPLAY PANEL COMPRISING SECTIONS OF AT LEAST ONE OF THE CONNECTING WIRES HAVING DIFFERENT THICKNESSES AND METHOD OF MANUFACTURING THE SAME

BACKGROUND OF THE INVENTION

1. Field of the Invention

The present invention relates to a display panel, and more particularly, to a display panel capable of reducing mismatching RC effect during signal transmission and method of manufacturing the same.

2. Description of the Prior Art

The progress of science and technology has led to small, effective, and portable intelligent information products becoming a part of our lives. Display devices play an important role because all intelligent information products, such as mobile phones, personal digital assistants (PDAs), or notebook computers, need display devices to be a communication interface. Because the liquid crystal display (LCD) panel is characterized by light weight, low power consumption, and low radiation, the LCD is a mature flat panel display technology. Due to the high vision quality requirements, the LCD is developed toward high quality, high resolution, and low price.

Please refer to FIG. 1, which is a schematic diagram of a prior art LCD panel 10. A display area 20 of the LCD panel 10 comprises a plurality of parallel data lines 12 and a plurality of parallel scanning lines 14. The data lines 12 are perpendicular to and interlaced with the scanning lines 14, and a pixel unit 16 is formed between each two adjacent data lines 12 and two adjacent scanning lines 14. The data lines 12 of the LCD panel 10 are separated into a plurality of groups of data lines. Each of the groups of data lines receives signals via a corresponding source driver $S_1$-$S_m$. The scanning lines 14 of the LCD panel 10 are separated into a plurality of groups of scanning lines. Each of the groups of the scanning lines receives signal via a corresponding gate driver integrated circuit (IC) $G_1$-$G_n$. The source drivers $S_1$-$S_m$ and the gate driver ICs $G_1$-$G_n$ are positioned on a non-display area 30 of the LCD panel 10. In order to enhance the image quality of the LCD panel, the number of the data lines of the LCD panel is usually increased. In order to reduce the cost of the LCD panel, the number of the source drivers is usually decreased. Therefore, in order to enhance the image quality of the LCD panel and to reduce the cost of the LCD panel, the number of data lines connected to a single source driver should be increased.

Please refer to FIG. 2, which is an enlarged view of the source driver $S_1$ of the LCD panel 10. There are a plurality of connecting pads 22 and connecting wires $C_1$-$C_{2m}$ connected between the source driver $S_1$ and the data lines $D_1$-$D_{2m}$. Therefore, the source driver $S_1$ is electrically connected to the data lines $D_1$-$D_{2m}$. The connecting wires $C_1$-$C_{2m}$ are linear wiring to connect with the source driver $S_1$ and the connecting pads 22. As shown in FIG. 2, the lengths of the periphery connecting wires $C_1$ and $C_{2m}$ are greater than the length of the middle connecting wire $C_m$. The greater the number of connecting wires $C_1$-$C_{2m}$, the greater the difference between the periphery connecting wire $C_1$ or $C_{2m}$ and the middle connecting wire $C_m$. Because the resistance of the connecting wire is directly proportional to its length, the resistance of the periphery connecting wire $C_1$ or $C_{2m}$ is greater than the resistance of the middle connecting wire $C_m$. Therefore, the impedance of the periphery connecting wire $C_1$ or $C_{2m}$ while the source driver $S_1$ is outputting is greater than that of any other connecting wire $C_2$-$C_{2m-1}$. Due to the mismatching RC effect during signal transmission, the image quality of the LCD panel 10 is worsened.

Please refer to FIG. 3, which is a schematic diagram of another prior art LCD panel 10'. In order to overcome the problem of mismatching RC effect, the middle connecting wire $C_m$ has zigzag wiring to increase the resistance of the connecting wire $C_m$ and to decrease the difference between the RC effect of the connecting wire $C_m$ and RC effect of the periphery connecting wire $C_1$ or $C_{2m}$. However, because the number of data lines $D_1$-$D_{2m}$ electrically connected to the source driver $S_1$ and the number of the connecting wires $C_1$-$C_{2m}$ are large, the space for laying out the connecting wire $C_m$ is limited. Therefore, even through the connecting wire $C_m$ is zigzag wiring, the difference between the length of the connecting wire $C_m$ and the connecting wire $C_1$ or $C_{2m}$ cannot be decreased effectively so that the difference between the RC effect of the connecting wire $C_m$ and RC effect of the connecting wire $C_1$ or $C_{2m}$ is decreased slightly. In addition, the difference between the resistance of other connecting wires adjacent to the connecting wire $C_m$, such as $C_{m-2}$, $C_{m-1}$, $C_{m+1}$ or $C_{m+2}$, and the periphery connecting wire $C_1$ or $C_{2m}$ cannot be ignored. Because of the limited layout area, the connecting wire $C_{m-2}$, $C_{m-1}$, $C_{m+1}$ or $C_{m+2}$ is difficult to be made to zigzag when the connecting wire $C_m$ is made to zigzag. In summary, the RC effect of the data lines and the connecting wire of the LCD panel 10' cannot be reduced effectively, so the image quality of the LCD panel 10' cannot be improved.

SUMMARY OF THE INVENTION

According to the claimed invention, a display panel is disclosed. The display panel comprises a substrate having a display area, a plurality of wires positioned over the display area of the substrate for signal transmission, a driver integrated circuit electrically connected to the wires for providing driving signals required for operations of the display panel, and a plurality of connecting wires of which each is electrically connected to a corresponding one of the wires and the driver integrated circuit. A first connecting wire of the connecting wires includes a first section and a second section, and a thickness of the second section is substantially different from that of the first section.

The present invention also discloses a method to manufacture a display panel. The method comprises setting up a plurality of wires for signal transmission over a display area of a substrate of the display panel, setting up a driver integrated circuit for providing driving signals required for operations of the display panel, and forming a first connecting wire for connecting one of the wires to the driver integrated circuit. The first connecting wire includes a first section and a second section, and a thickness of the second section is substantially thinner than that of the first section.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
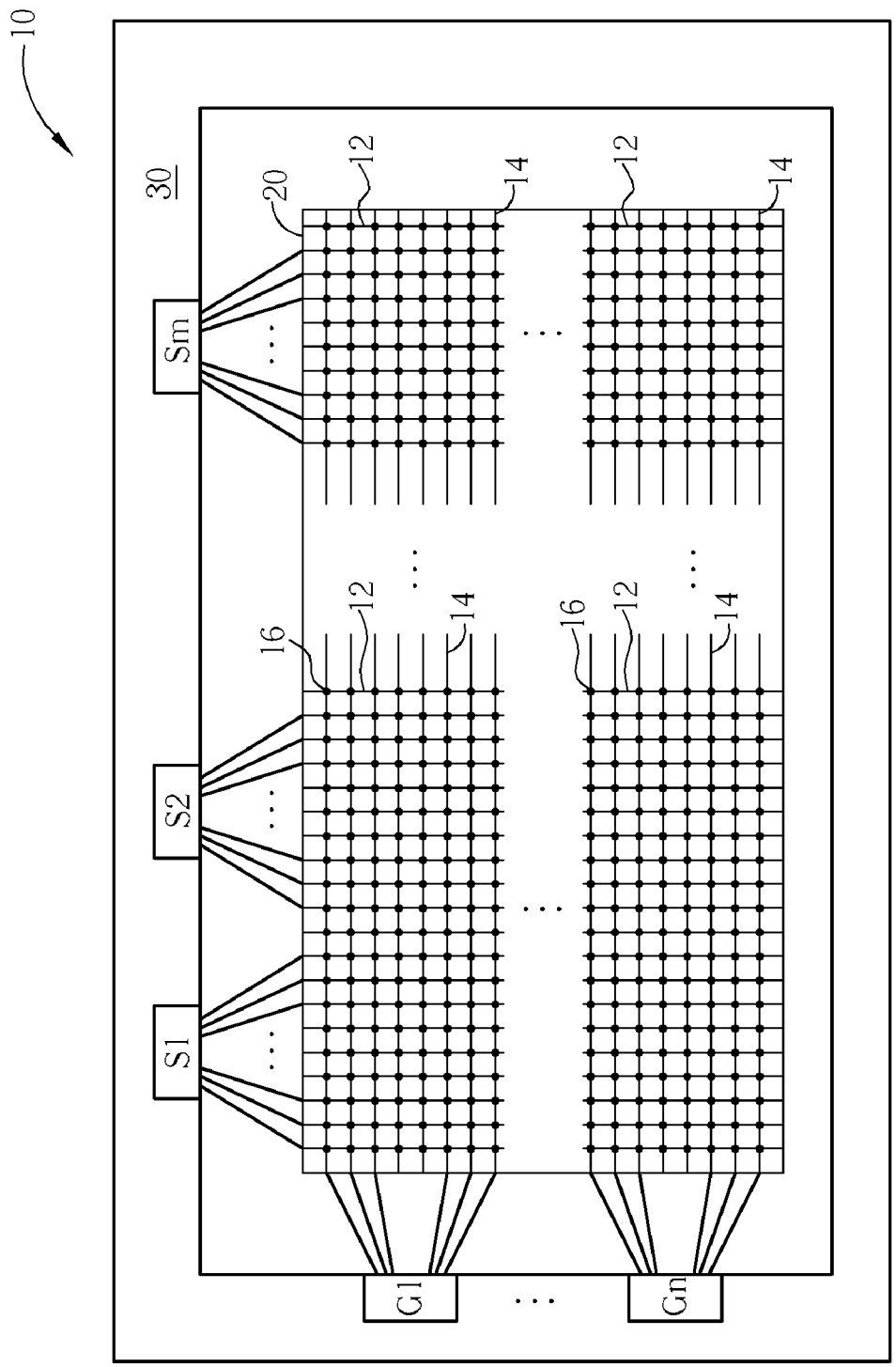
FIG. 1 is a schematic diagram of a prior art LCD panel.
Figure 2:
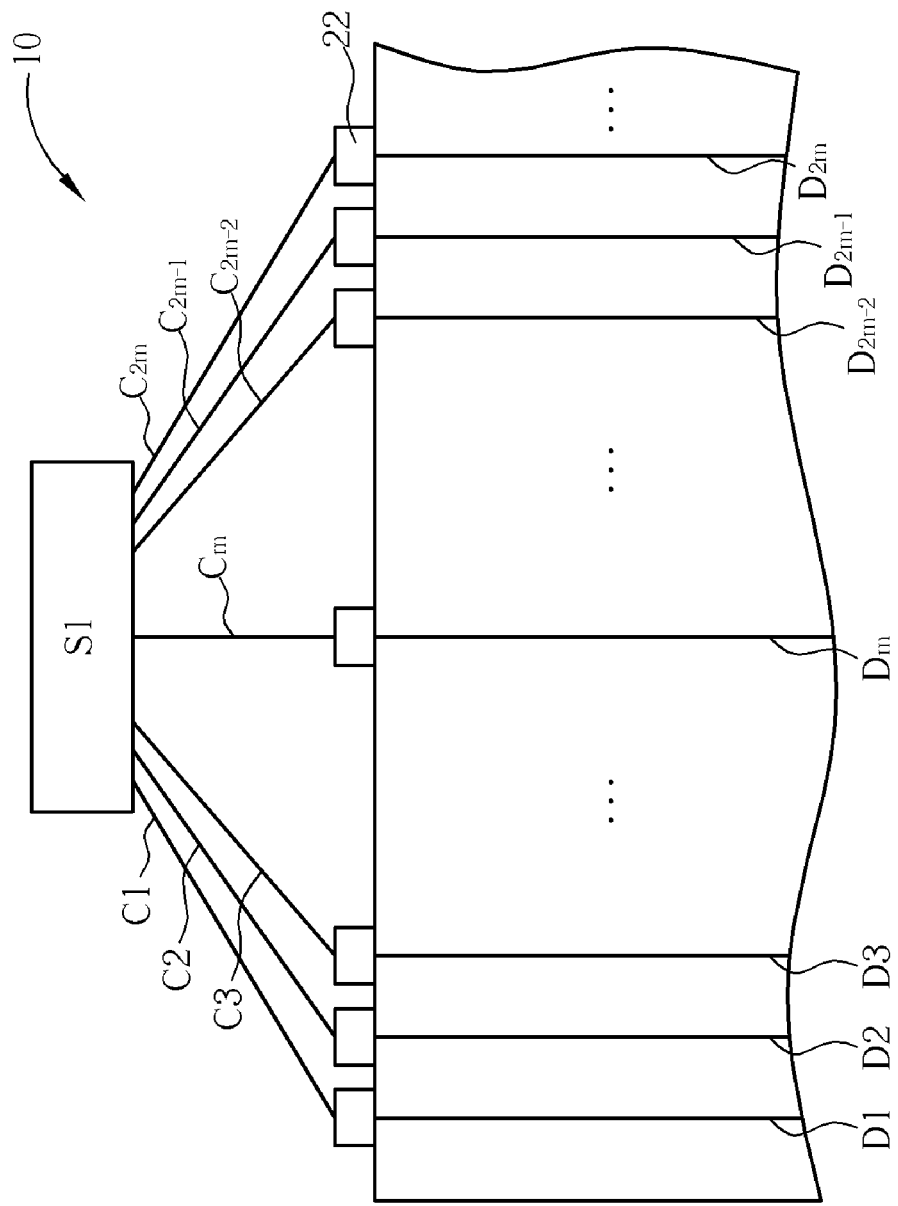
FIG. 2 is an enlarged view of the source driver of the LCD panel shown in FIG. 1.
Figure 3:
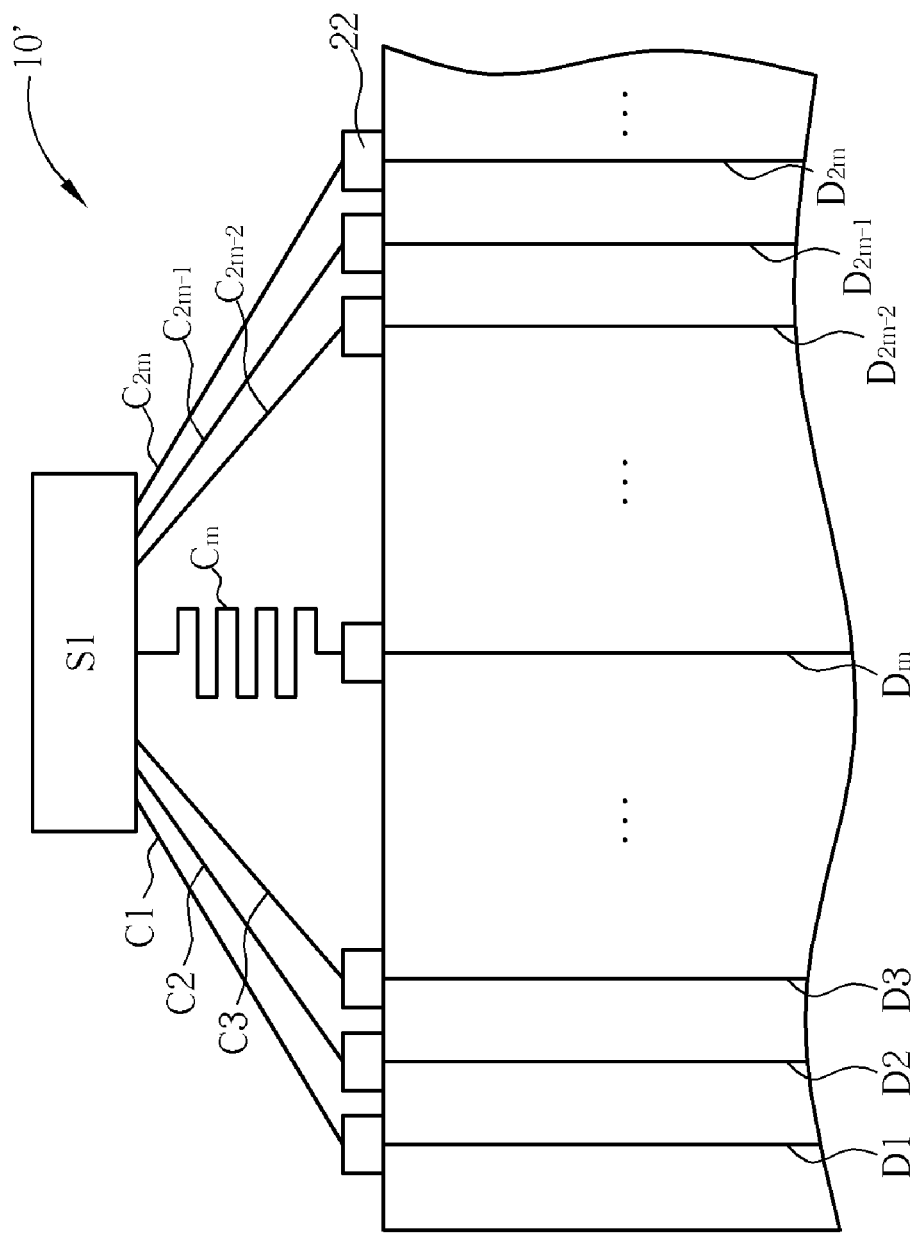
FIG. 3 is a schematic diagram of another prior art LCD panel.
Figure 4:
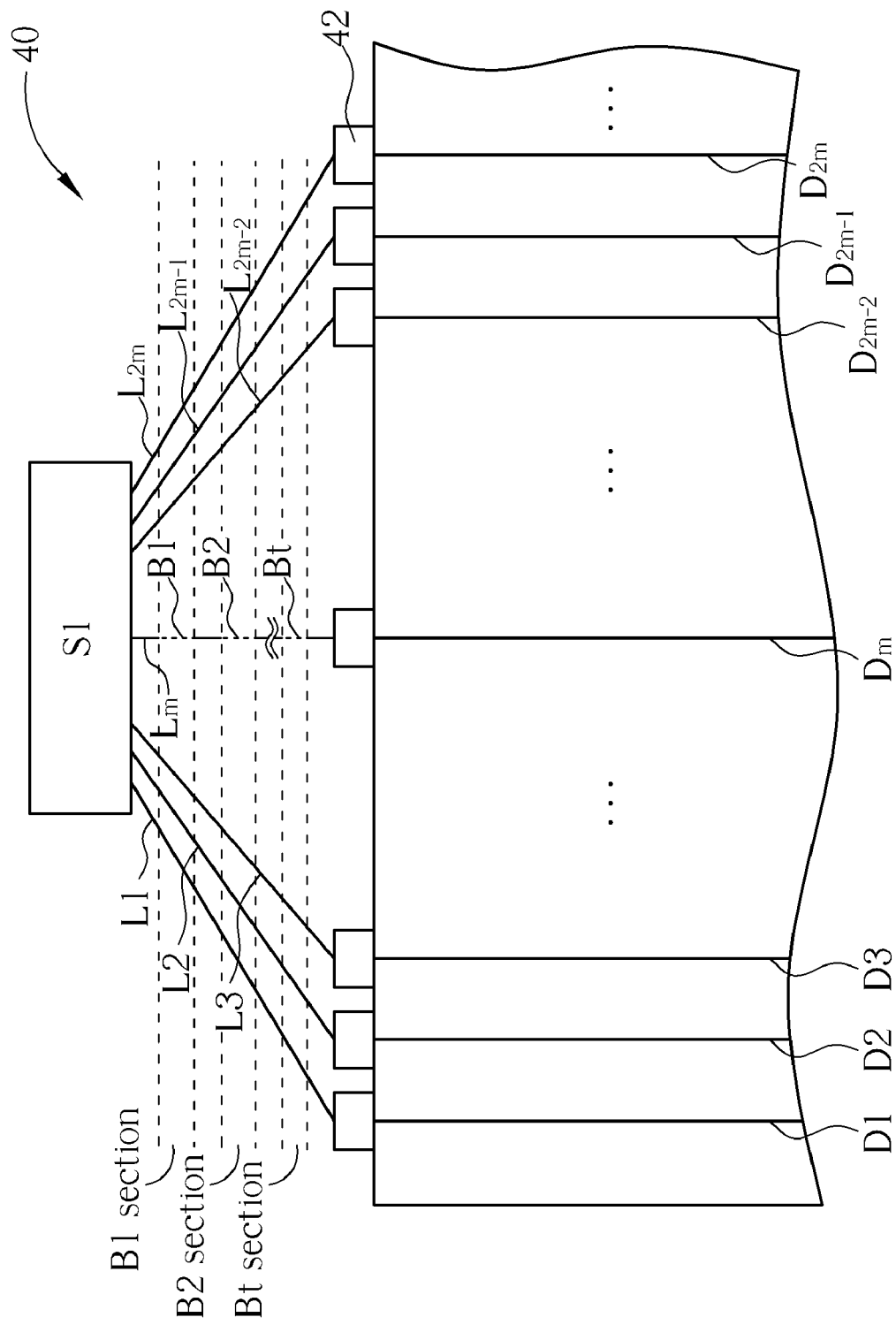
FIG. 4 illustrates the layout of a driver circuit and wires of a first embodiment LCD panel according to the present invention.

Please refer to FIG. 4, which illustrates the layout of a driver circuit and wires of a first embodiment LCD panel 40 according to the present invention. In the embodiment, the source driver IC $S_1$ and the data lines $D_1$-$D_{2m}$ of the LCD panel 40 are used to explain how to perform a layout according to the present invention. Supposing that the source driver IC $S_1$ transmits signals to the data lines $D_1$-$D_{2m}$, it is necessary to set up a plurality of connecting pads 42 and a plurality of connecting wires $L_1$-$L_{2m}$ on the LCD panel 40 to electrically connect the data lines $D_1$-$D_{2m}$ to the source driver IC $S_1$. In the first embodiment, the connecting wires $L_1$-$L_{2m}$ are linear wiring to connect the connecting pads 42 to the source driver circuit $S_1$. The resistance R of the connecting wire $L_1$-$L_{2m}$ can be described by:

$$R = \sigma L/A$$

wherein $\sigma$ is a coefficient of resistance of the connecting wires $L_1$-$L_{2m}$, L is a length of the connecting wires $L_1$-$L_{2m}$, and A is a cross-sectional area of the connecting wires $L_1$-$L_{2m}$.

Because the lengths of the periphery connecting wires L1 and L2m are greater than the length of the middle connecting wire Lm and the resistances of the connecting wires L1-L2m is directly proportional to their lengths, a halftone mask is used to form the connecting wires L1-L2m to reduce thickness of some sections of the connecting wires L1-L2m to reduce the differences of the resistances of the connecting wires L1-L2m. In the first embodiment, each of the connecting wires L1-L2m includes sections B1-Bt, and some material of the sections B1-Bt of the shortest connecting wire Lm is removed by executing an exposure procedure using the halftone mask to thin the sections B1-Bt of the connecting wire Lm. Therefore, the cross-sectional areas of the sections B1-Bt are less than that of the connecting wire Lm, where the B1-Bt are indicated by dotted lines in FIG. 4. And the sections B1-Bt of the shortest connecting wire Lm have different thickness from the sections B1-Bt of the rest of the connecting wires. Because resistance of a connecting wire is inversely proportional to the cross-sectional area of the connecting wire, the difference between the resistance of the connecting wire Lm and the resistance of the peripheral connecting wire L1 or L2m can be reduced by thinning the sections B1-Bt of the connecting wire Lm. In addition, the number and the lengths of the sections B1-Bt are determined according to the difference between the resistance of the connecting wire Lm and the resistance of the peripheral connecting wire L1 or L2m.

Figure 5:
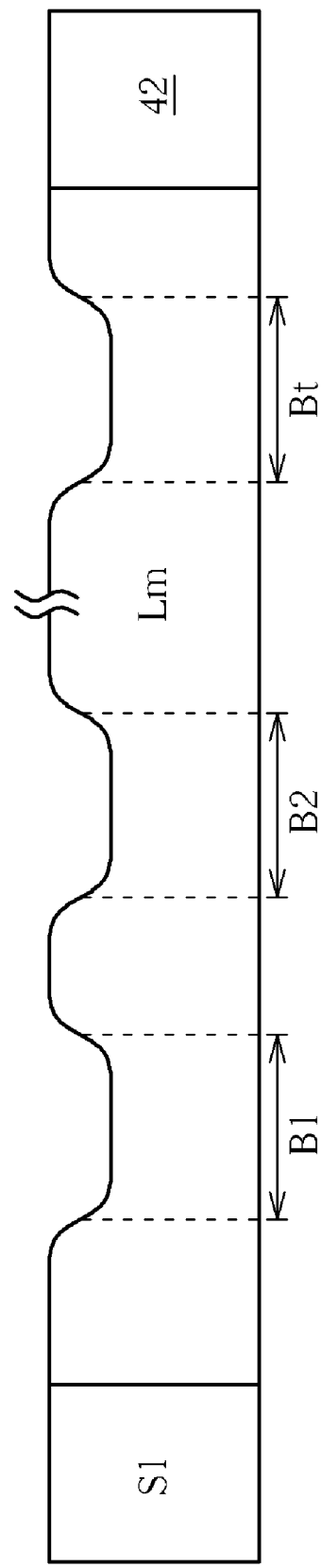
FIG. 5 is a cross-sectional diagram of the middle connecting wire of the first embodiment LCD panel.

Please refer to FIG. 5, which is a cross-sectional diagram of the connecting wire $L_m$ of the first embodiment LCD panel 40. It indicates that the sections B1-Bt of the connecting wire $L_m$ are thinned. Therefore, the resistance of the sections $B_1$-$B_t$ is greater than the resistance of other sections of the connecting wire $L_m$, and the difference between the resistance of the connecting wire $L_m$ and the resistance of the peripheral connecting wire $L_1$ or $L_{2m}$ is reduced. As can be seen from FIG. 5, the sections $B_1$-$B_t$ are the thinnest sections of the connecting wire $L_m$. Each of the sections $B_1$-$B_t$ is located between the thicker sections.

Figure 6:
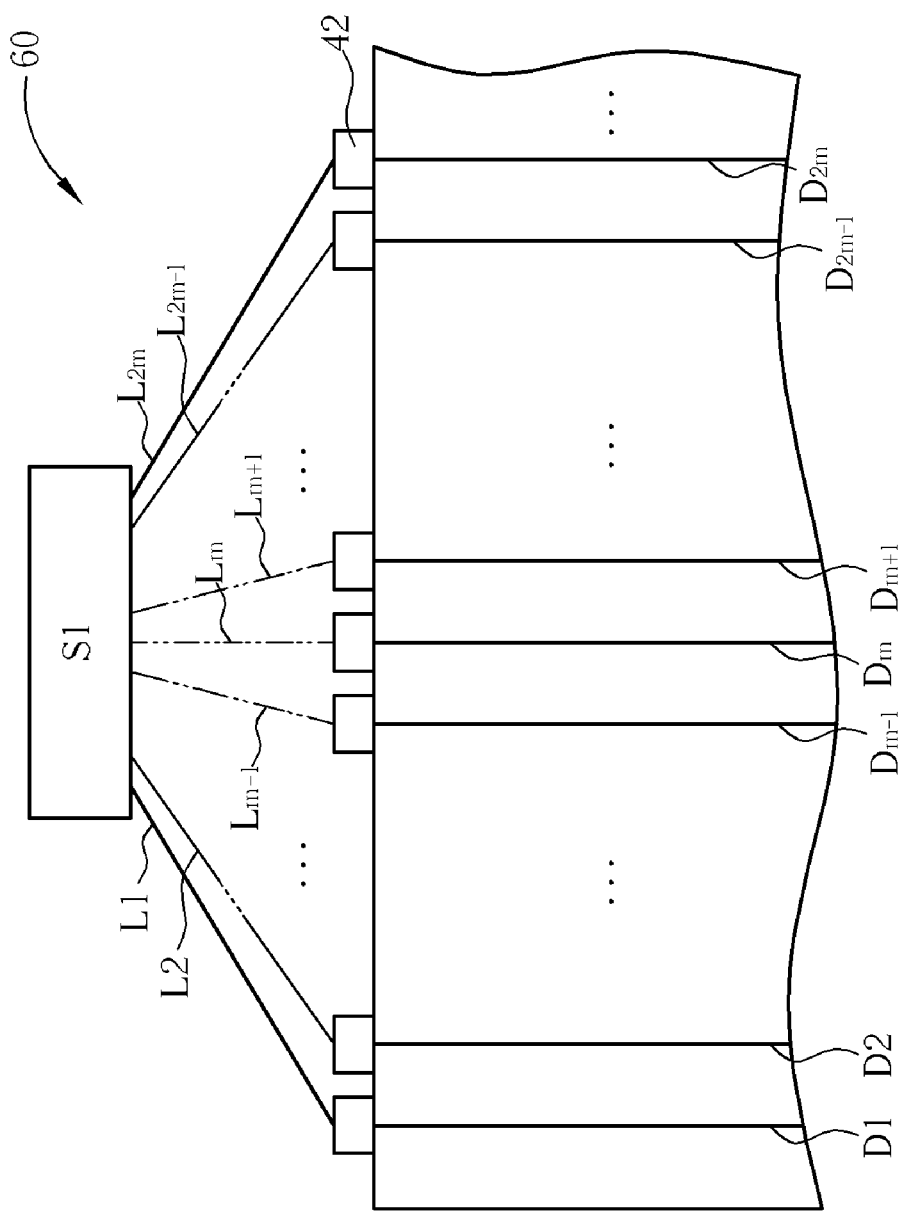
FIG. 6 illustrates the layout of a driver circuit and wires of a second embodiment LCD panel according to the present invention.

In the first embodiment, only some sections of the connecting wire $L_m$ are thinned. However, in a second embodiment of the present invention, the resistances of some connecting wires are increased by thinning their sections. Please refer to FIG. 6, which illustrates the layout of a driver circuit and wires of a second embodiment LCD panel 60 according to the present invention. In the second embodiment, the source driver IC $S_1$ and the data lines $D_1$-$D_{2m}$ of the LCD panel 60 are also used to explain how to perform the layout according to the present invention. In the embodiment, with the exception of the longest connecting wires $L_1$ and $L_{2m}$, all connecting wires $L_2$-$L_{2m-1}$ include some thinned sections. The number and the lengths of the thinned sections of the connecting wires $L_2$-$L_{2m-1}$ are determined according to the differences between the resistances of the connecting wires $L_2$-$L_{2m-1}$ and the resistance of the peripheral connecting wire $L_1$ or $L_{2m}$. Therefore, $N(L_m) > N(L_{m-1}$ or $L_{m+1}) > N(L_{m-2}$ or $L_{m+2}) > \ldots > N(L_2$ or $L_{2m-1})$, where $N(L_m)$ represents the number of thinned sections of the connecting wire $L_m$, and $N(L_p$ or $L_q)$ represents the number of thinned sections of the connecting wire $L_p$ or $L_q$.

Figure 7:
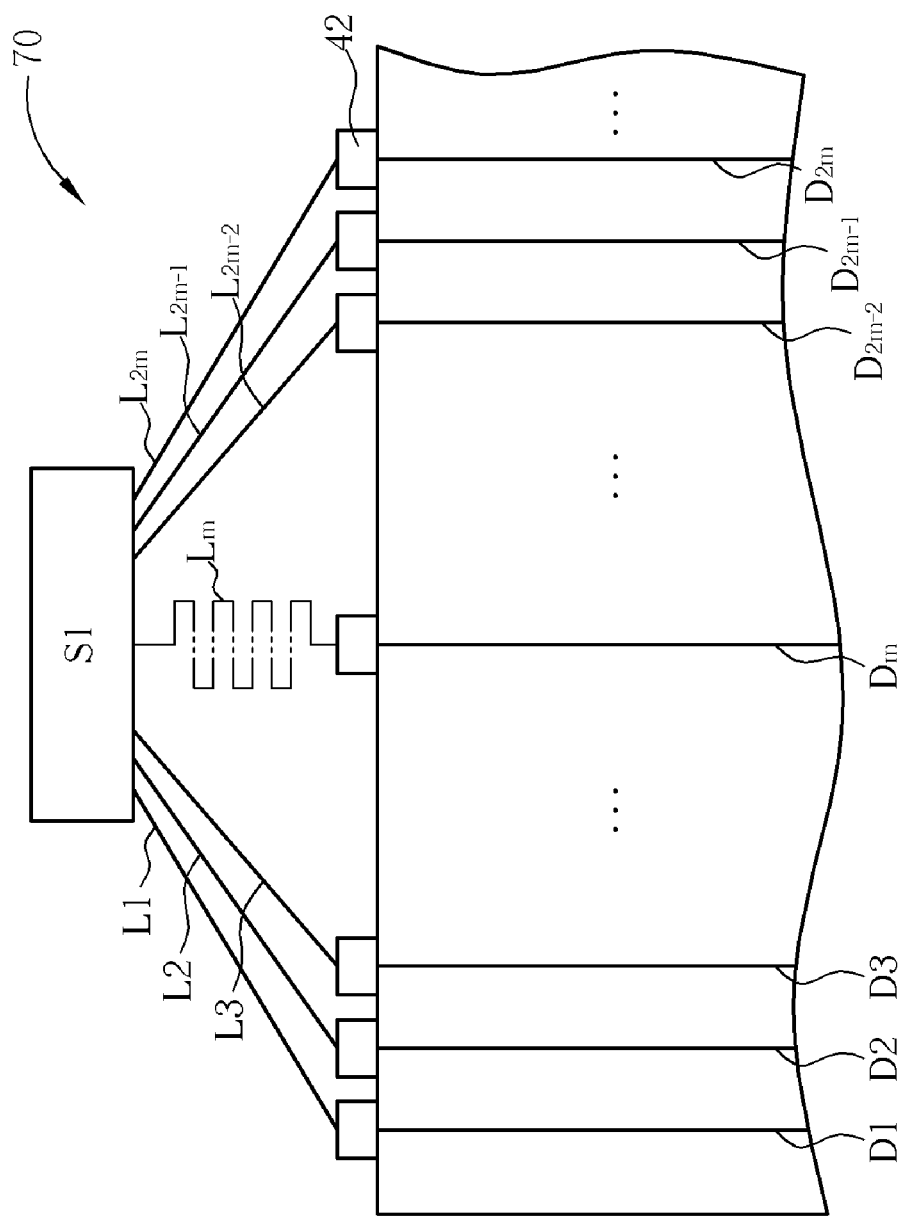
FIG. 7 illustrates the layout of a driver circuit and wires of a third embodiment LCD panel according to the present invention.

Please refer to FIG. 7, which illustrates the layout of a driver circuit and wires of a third embodiment LCD panel 70 according to the present invention. In the second embodiment, the source driver IC $S_1$ and the data lines $D_1$-$D_{2m}$ of the LCD panel 60 are used to explain how to perform the layout according to the present invention. In the third embodiment, the middle connecting wire $L_m$ not only includes the thinned sections $B_1$-$B_t$, but also is a zigzag-shaped wiring. The resistance of the connecting wire $L_m$, hence, is increased by thinning the sections $B_1$-$B_t$ and by elongating the connecting wire $L_m$. Therefore, the difference between the resistance of the connecting wire $L_m$ and the resistance of the peripheral connecting wire $L_1$ or $L_{2m}$ can be reduced more effectively when the number of connecting wires $L_1$-$L_{2m}$ is large.

Even though the source driver IC $S_1$ and the data lines $D_1$-$D_{2m}$ of the LCD panels 40, 60, and 70 are used to describe how to perform the layout according to the present invention, it should be noted that the present invention also can be adopted to wiring between the scanning lines and the gate driver ICs of the LCD panels. The number of the connecting wires, the number and the lengths of the thinned sections, and the number of the connecting wires including the thinned sections are not limited by the above embodiments, and the number of the connecting wires including the thinned sections is preferably smaller than the number of the connecting wires. In addition, the source driver ICs and the gate driver ICs can be positioned on a non-display area of the substrate of the LCD panel or be positioned adjacent to the substrate via a flexible printed circuit (FPC) board.

In contrast with the prior art LCD panel, the mismatching RC effect during signal transmission of the LCD panels 40, 60, and 70 of the present invention is reduced by executing an exposure procedure using a halftone mask to thin some sections of longer connecting wire connected to driver ICs. Therefore, the connecting wires can be wired within a limited layout area so that the number of connecting wires coupled to each driver IC is increased. The image quality of the LCD panels can be improved effectively. Moreover, the resolution of LCD panels can be increased, and the cost of LCD panels can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display panel comprising:
   a substrate having a display area;
   a plurality of wires positioned over the display area of the substrate for signal transmission;
   a driver integrated circuit electrically connected to the wires for providing driving signals required for operations of the display panel; and
   a plurality of connecting wires of which each is electrically connected to a corresponding one of the wires and the driver integrated circuit, each of the plurality of the connecting wires including a plurality of sections, wherein the sections of at least one of the connecting wires have substantially different thicknesses, the thinnest section of a first connecting wire is located between the thicker sections of the first connecting wire, and at least one of the plurality of the connecting wires has different resistance from the rest of the plurality of the connecting wires.

2. The display panel of claim 1 wherein the wires include a plurality of parallel scanning lines and a plurality parallel data lines, the scanning lines being perpendicular to and interlaced with the data lines, a pixel unit being formed between each two adjacent scanning lines and two adjacent data lines.

3. The display panel of claim 1 wherein the wires are a plurality of parallel data lines, the driver integrated circuit is a source driver integrated circuit, and connecting wires are electrically connected to the data lines and the source driver integrated circuit.

4. The display panel of claim 1 wherein the wires are a plurality of parallel scanning lines, the driver integrated circuit is a gate driver integrated circuit, and the connecting wires are electrically connected to the scanning lines and the gate driver integrated circuit.

5. The display panel of claim 1 wherein all of the connecting wires are linear wiring.

6. The display panel of claim 1 wherein the first connecting wire is zigzagged wiring.

7. The display panel of claim 1 being a liquid crystal display panel.

8. The display panel of claim 1 wherein the substrate further comprises a non-display area, and the driver integrated circuit is positioned on the non-display area.

9. The display panel of claim 1 further comprising a flexible printed circuit board, wherein the driver integrated circuit is positioned adjacent to the substrate via the FPC board.

10. A method for manufacturing a display panel, the method comprising:
    setting up a plurality of wires for signal transmission over a display area of a substrate of the display panel;
    setting up a driver integrated circuit for providing driving signals required for operations of the display panel; and
    forming a plurality of connecting wires each connecting one of the wires to the driver integrated circuit, wherein each of the plurality connecting wires includes a plurality of sections, the sections of at least one of the connecting wires have substantially different thicknesses, the thinnest section of a first connecting wire is located between the thicker sections of the first connecting wire, and at least one of the plurality of the connecting wires has different resistance from the rest of the plurality of the connecting wires.

11. The method of claim 10 wherein the first connecting wire is formed via a halftone mask.

12. The method of claim 10 wherein setting up a driver integrated circuit for providing driving signals required for operations of the display panel is setting up a driver integrated circuit on a non-display area of the substrate to provide driving signals required for operations of the display panel.

13. The method of claim 10 wherein setting up a driver integrated circuit for providing driving signals required for operations of the display panel is setting up a driver integrated circuit adjacent to the substrate to provide driving signals required for operations of the display panel.

14. The display panel of claim 1 wherein the connecting wire having the longest length includes the plurality of sections whose thicknesses are the same.

15. The method of claim 10 wherein the connecting wire having the longest length includes the plurality of sections whose thicknesses are the same.

* * * * *